(12) United States Patent  (10) Patent No.: US 7,644,725 B2
Matsuzawa et al.  (45) Date of Patent: Jan. 12, 2010

(54) MIXING VALVE AND MIXING DEVICE

(75) Inventors: Hironori Matsuzawa, Kanawgawa (JP);
Nobuyuki Fujikawa, Kanawgawa (JP)

(73) Assignee: Advance Electric Japan Kabushiki Kaisha, Aichi (JP)

( * ) Notice: Subject to any disclaimer, the term of this patent is extended or adjusted under 35 U.S.C. 154(b) by 298 days.

(21) Appl. No.: 11/304,731

(22) Filed: Dec. 16, 2005

(65) Prior Publication Data
US 2007/0137707 A1 Jun. 21, 2007

(51) Int. Cl.
*F16K 51/00* (2006.01)
(52) U.S. Cl. .................. 137/240; 137/606; 137/559
(58) Field of Classification Search .......... 137/240, 137/3, 7, 606, 559
See application file for complete search history.

(56) References Cited

U.S. PATENT DOCUMENTS

| 3,797,524 | A | * | 3/1974 | Sanelli | 137/606 |
| 4,496,845 | A | * | 1/1985 | Ensign et al. | 290/43 |
| 4,640,221 | A | * | 2/1987 | Barbee et al. | 118/689 |
| 4,694,390 | A | * | 9/1987 | Lee | 700/45 |
| 4,863,098 | A | * | 9/1989 | Kolze et al. | 236/12.12 |
| 5,653,259 | A | * | 8/1997 | Ramstad | 137/606 |
| 5,769,108 | A | * | 6/1998 | Proudman | 137/7 |
| 5,884,649 | A | * | 3/1999 | Proudman | 137/7 |
| 6,192,932 | B1 | * | 2/2001 | Izumo et al. | 137/606 |
| 6,889,709 | B2 | * | 5/2005 | Hanada et al. | 137/606 |

FOREIGN PATENT DOCUMENTS

| JP | 2671183 | 7/1997 |
| JP | 3207782 | 7/2001 |
| JP | 3276936 | 2/2002 |

* cited by examiner

*Primary Examiner*—Kevin L Lee
(74) *Attorney, Agent, or Firm*—Cheng Law Group, PLLC

(57) ABSTRACT

The object is to provide a mixing valve and a mixing device which can more easily control the flow rates of one fluid and another fluid or fluids in comparison with a conventional mixing valve. In a mixing valve 10A in which a main passage 13 through which one fluid f1 passes and at least one subsidiary passage 14 (14A, 14B) through which the other fluids f2, f3 pass are connected via opening/closing valve portions 20A, 20B to open/close communicating openings 18A, 18B, pressure sensors 31, 32, 33 (34) are disposed in the main passage and the subsidiary passages, respectively, to detect the pressures of the fluids passing through the main passage and the subsidiary passages.

8 Claims, 8 Drawing Sheets

MIXING VALVE AND MIXING DEVICE

BACKGROUND OF THE INVENTION

1. Field of the Invention

The present invention relates to a mixing valve in which a main passage through which one fluid passes and one or plural subsidiary passages through which the other fluids pass are connected; and a mixing device using the mixing valve.

2. Description of the Prior Art

In manufacturing fields of, for example, semiconductor devices or chemicals, pure water may be supplied to a predetermined work site through a pipe. In this respect, a mixing valve 110 shown in FIG. 8, such as a manifold valve or the like, is used to mix the pure water and other fluids, such as chemical or the like, appropriately selected in accordance with the operation to be conducted or the product to be manufactured (see, for example, Japanese Patent No. 3207782).

As shown in FIG. 8, in the mixing valve 110, a main passage 113 through which one fluid, e.g., the above pure water (first fluid f1) passes and subsidiary passages 114A, 114B, 114C through which the other fluids, e.g., various chemicals (second fluid f2, third fluid f3, fourth fluid f4) pass are connected via opening/closing valve portions 120A, 120B, 120C to open/close communicating openings 116A, 116B, 116C. Numeral 111 designates a main body block, and numeral 112 designates a valve block.

The subsidiary passages 114A, 114B, 114C are formed beneath the main passage 113. The upper ends thereof open as the communicating openings 116A, 116B, 116C in the main passage 113, and the second, third, fourth fluids f2, f3, f4 passing through the subsidiary passages 114A, 114B, 114C are upwardly supplied to the main passage 113. The communicating openings 116A, 116B, 116C can be opened/closed by the corresponding opening/closing valve portions 120A, 120B, 120C provided in the valve block 112, separately.

The opening/closing valve portions 120A, 120B, 120C are disposed on the communicating openings 116A, 116B, 116C in the main passage 113. Valve bodies 124 are forwardly or backwardly moved across the main passage 113 by air or the like controlled by a controller (not shown), so that the corresponding communicating openings 116A, 116B, 116C are opened/closed inside the main passage 113, to supply or stop supplying the second, third, fourth fluids f2, f3, f4 from the subsidiary passages 114A, 114B, 114C into the main passage 113. Numeral 122 designates pistons of the opening/closing valve portions 120A, 120B, 120C. Numeral 126 designates a diaphragm. Numeral "S" designates a spring to always bias the valve body 124 in the forward direction.

Conventionally, in the mixing valve 110, it is necessary to control the flow rates of the fluids passing through the main passage 113 and the subsidiary passages 114A, 114B, 114C, using outside detecting means such as a flow sensor connected to a pipe of the mixing valve 110.

However, in the above mixing valve, it is inconvenient to dispose detection means in outside passages for a plurality of fluids, and a complicated layout of pipes, wires or the like may cause a trouble. Recently, in such a mixing valve, a more simple structure to control the flow rates of various fluids has been required.

SUMMARY OF THE INVENTION

In view of the above problems, the object of the present invention is to provide a mixing valve and a mixing device which can more easily control the flow rates of fluids. In the mixing valve, a main passage through which one fluid passes and one or plural subsidiary passages through which the other fluids pass are connected.

Namely, the first embodiment of the invention provides a mixing valve in which a main passage through which one fluid passes and at least one subsidiary passage through which the other fluids pass are connected via an opening/closing valve portion to open/close a communicating opening, wherein pressure sensors are disposed in the main passage and the subsidiary passage, respectively, to detect the pressures of the fluids passing through the main passage and the subsidiary passage.

The second embodiment of the invention provides a mixing valve according to the first embodiment, wherein an opening/closing valve portion for the one fluid is provided in the main passage.

The third embodiment of the invention provides a mixing valve according to the first embodiment, wherein a plurality of pressure sensors are arranged in the main passage via a pressure loss portion.

The fourth embodiment of the invention provides a mixing valve according to the third embodiment, wherein the pressure loss portion is an orifice.

The fifth embodiment of the invention provides a mixing valve according to the first embodiment, wherein a valve seat of the communicating opening in the opening/closing valve portion is disposed so as to face the inside of the main passage; and the subsidiary passage are closed, inside the main passage, by a valve body of the opening/closing valve portion.

The sixth embodiment of the invention provides a mixing valve according to the first embodiment, wherein a passage for a washing fluid is connected to the main passage via the opening/closing valve portion.

The seventh embodiment of the invention provides a mixing valve according to any one of the first, second and sixth embodiments, wherein there is provided display means to display the open/close of the valve body of the opening/closing valve portion.

The eighth embodiment of the invention provides a mixing device comprising the mixing valve described in any one of the first to the seventh embodiments; a control valve disposed in a fluid supply passage connected to at least the subsidiary passage of the mixing valve, to control the flow rate or the pressure of a fluid passing through the supply passage; and a controller which calculates based on signals received from the pressure sensors of the mixing valve, to send a signal for maintaining a predetermined mixing ratio to the control valve.

The ninth embodiment of the invention provides a mixing device according to the eighth embodiment, further comprising a control valve disposed in a fluid supply passage connected to the main passage of the mixing valve, to control the flow rate or the pressure of a fluid passing through the supply passage.

According to a mixing valve described in the first embodiment, there is provided a mixing valve in which a main passage through which one fluid passes and at least one subsidiary passage through which the other fluids pass are connected via an opening/closing valve portion to open/close a communicating opening, wherein pressure sensors are disposed in the main passage and the subsidiary passage, respectively, to detect the pressures of the fluids passing through the main passage and the subsidiary passage. Therefore, the flow rates of the fluids can be easily detected.

According to the invention described in the second embodiment, in the invention described in the first embodiment, an opening/closing valve portion for the one fluid is provided in the main passage. Therefore, the flow of the one fluid can be controlled in the mixing valve.

According to the invention described in the third embodiment, in the invention described in the first embodiment, a plurality of pressure sensors are arranged in the main passage via a pressure loss portion. Therefore, the flow rate of the fluid passing through the main passage can be detected.

According to the invention described in the fourth embodiment, in the invention described in the third embodiment, the pressure loss portion is an orifice. Therefore, the pressure loss portion can be easily formed.

According to the invention described in the fifth embodiment, in the invention described in the first embodiment, a valve seat of the communicating opening in the opening/closing valve portion is disposed so as to face the inside of the main passage; and the subsidiary passage are closed, inside the main passage, by a valve body of the opening/closing valve portion. Therefore, the residence of the fluid (so-called "residue") occurring when the opening/closing valve portion is closed can be reduced, and connections between the main passage and the subsidiary passage can be effectively and efficiently cleaned.

According to the invention described in the sixth embodiment, in the invention described in the first embodiment, a passage for a washing fluid is connected to the main passage via the opening/closing valve portion. Therefore, the mixing valve can be easily cleaned.

According to the invention described in the seventh embodiment, in the invention described in any one of the first, second and sixth embodiments, there is provided display means to display the open/close of the valve body of the opening/closing valve portion. Therefore, the open/close of the opening/closing valve portion can be checked from the outside.

According to a mixing device described in the eighth embodiment, there is provided a mixing device comprising the mixing valve described in any one of the first to the seventh embodiments; a control valve disposed in a fluid supply passage connected to at least the subsidiary passage of the mixing valve, to control the flow rate or the pressure of a fluid passing through the supply passage; and a controller which calculates based on signals received from the pressure sensors of the mixing valve, to send a signal for maintaining a predetermined mixing ratio to the control valve. Therefore, the flow rate of a fluid passing through the subsidiary passage can be controlled using an extremely simple structure.

According to the invention described in the ninth embodiment, the invention described in the eighth embodiment is further comprised of a control valve disposed in a fluid supply passage connected to the main passage of the mixing valve, to control the flow rate or the pressure of a fluid passing through the supply passage. Therefore, the flow rate of a fluid passing through the main passage in addition to that of a fluid passing through the subsidiary passage can be controlled using an extremely simple structure.

DESCRIPTION OF THE PREFERRED EMBODIMENTS

Figure 1:
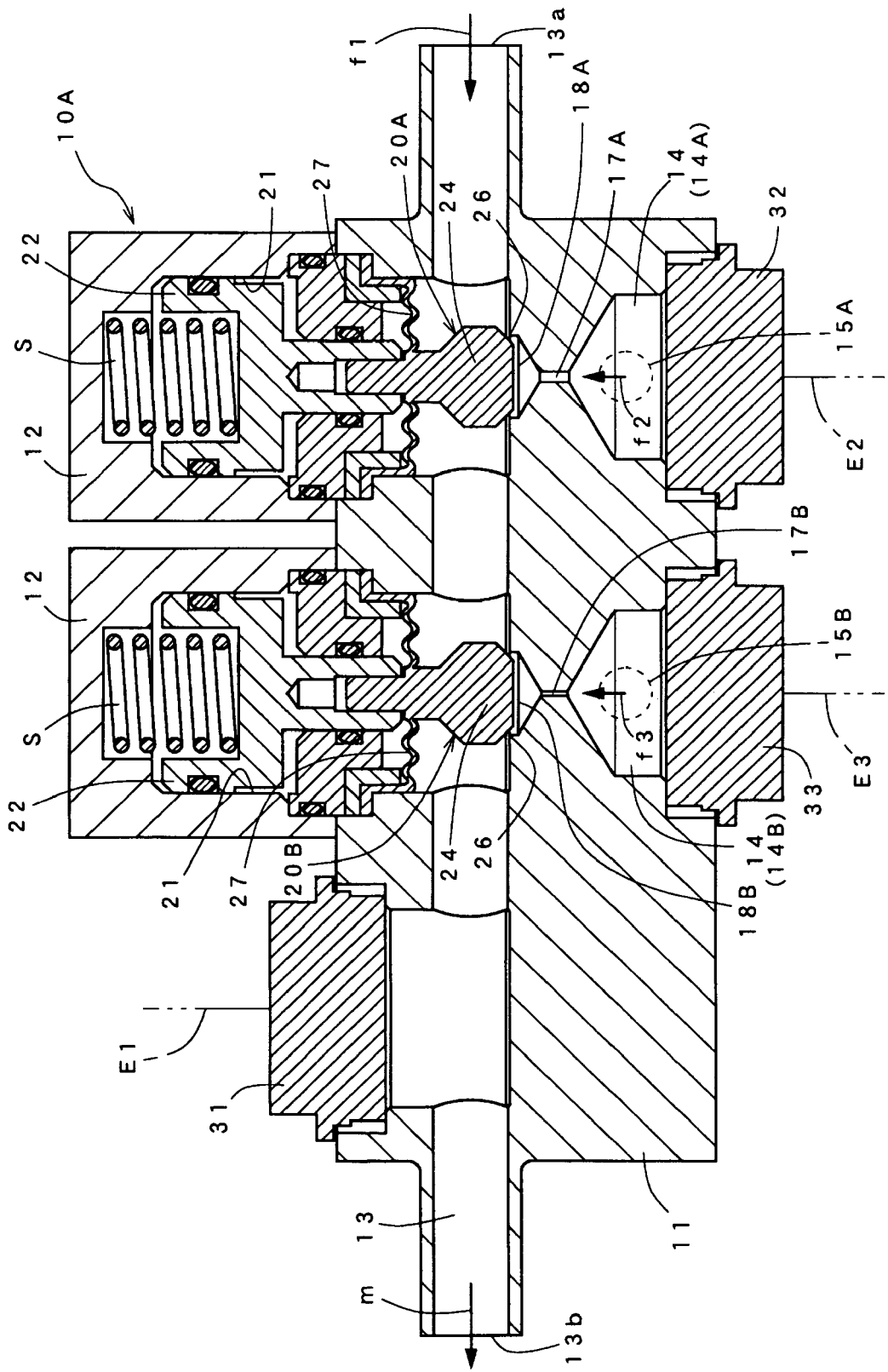
FIG. 1 is a sectional view of a first embodiment of a mixing valve according to the present invention.
Figure 2:
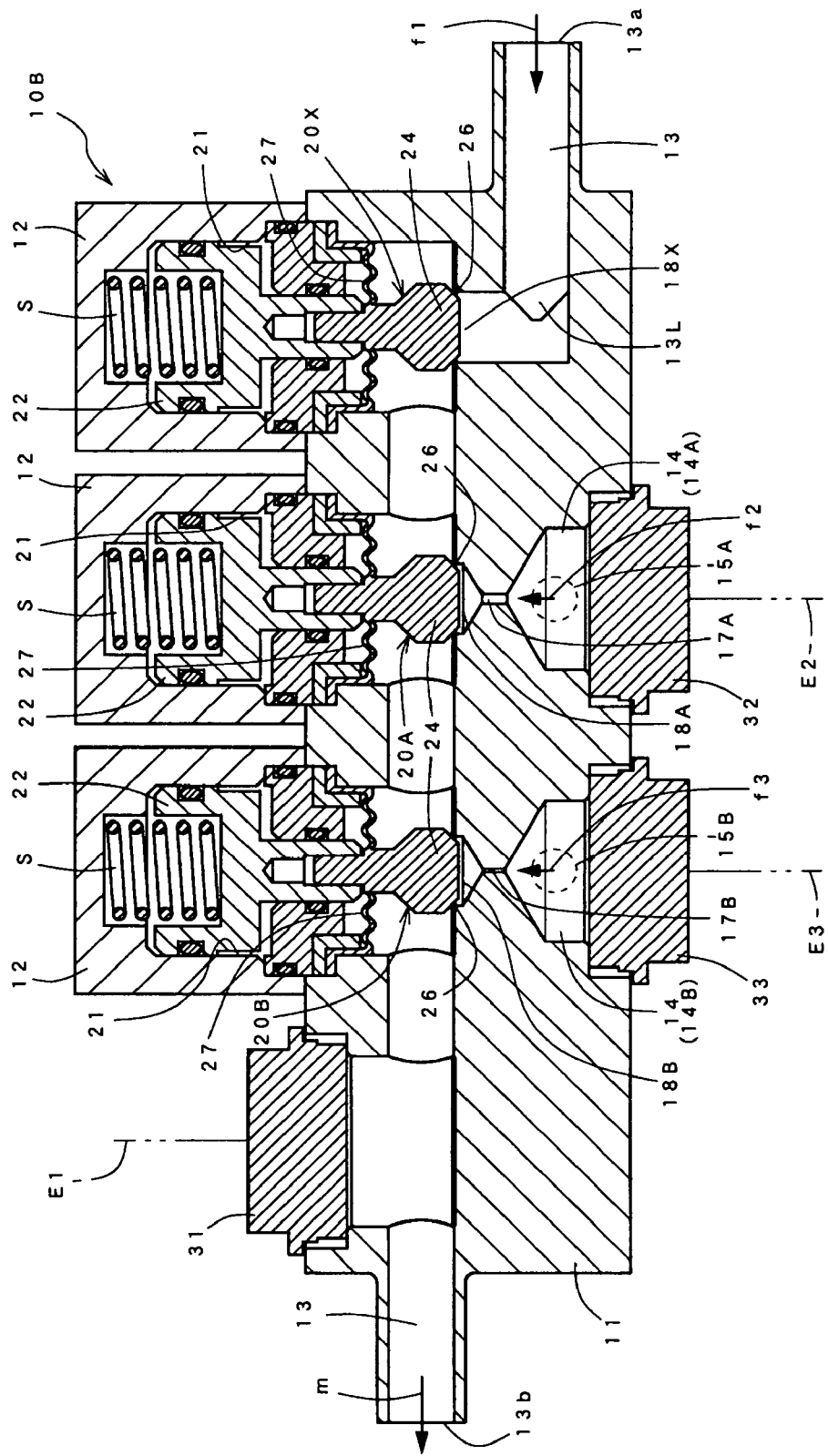
FIG. 2 is a sectional view of a second embodiment of a mixing valve according to the present invention.
Figure 3:
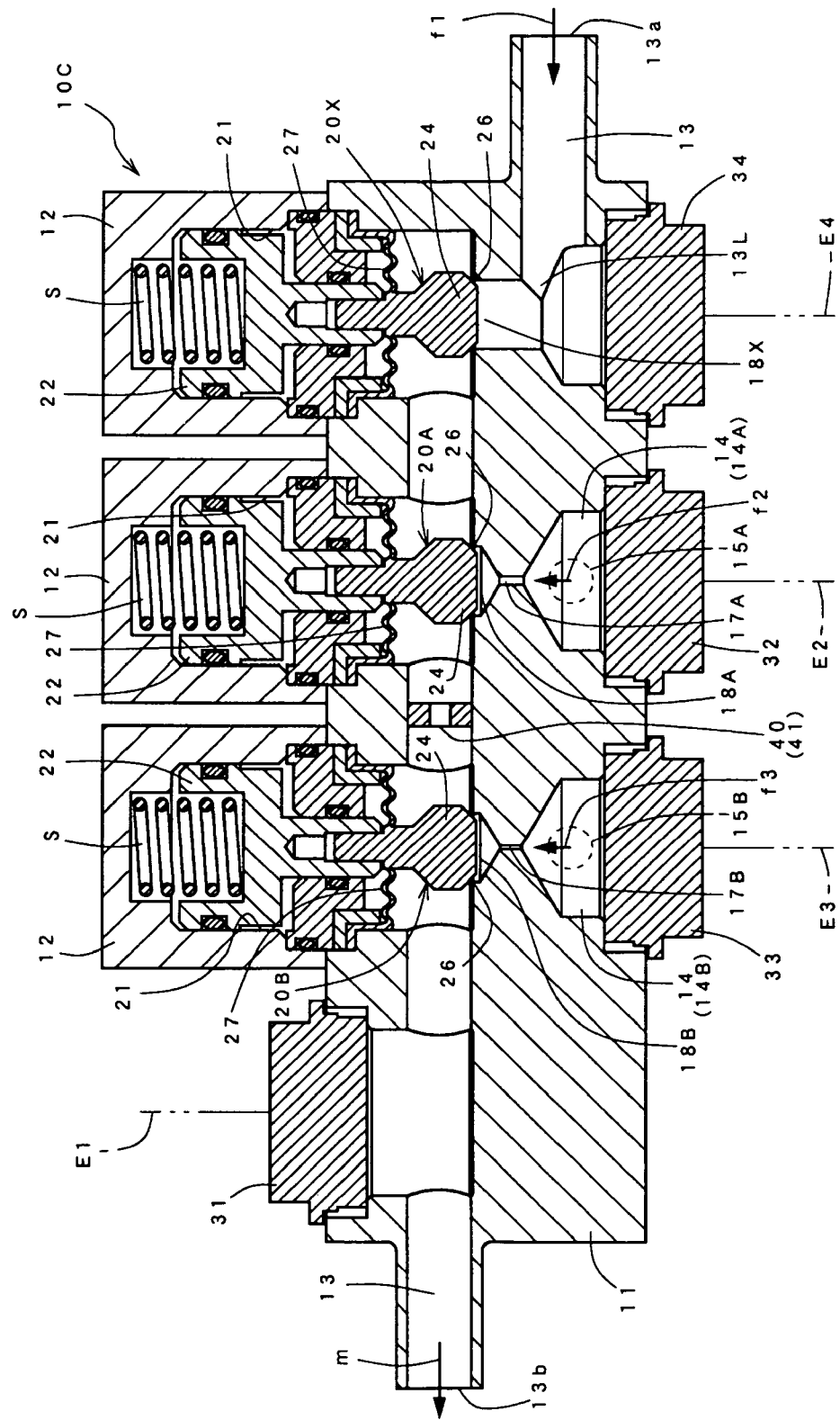
FIG. 3 is a sectional view of a third embodiment of a mixing valve according to the present invention.
Figure 4:
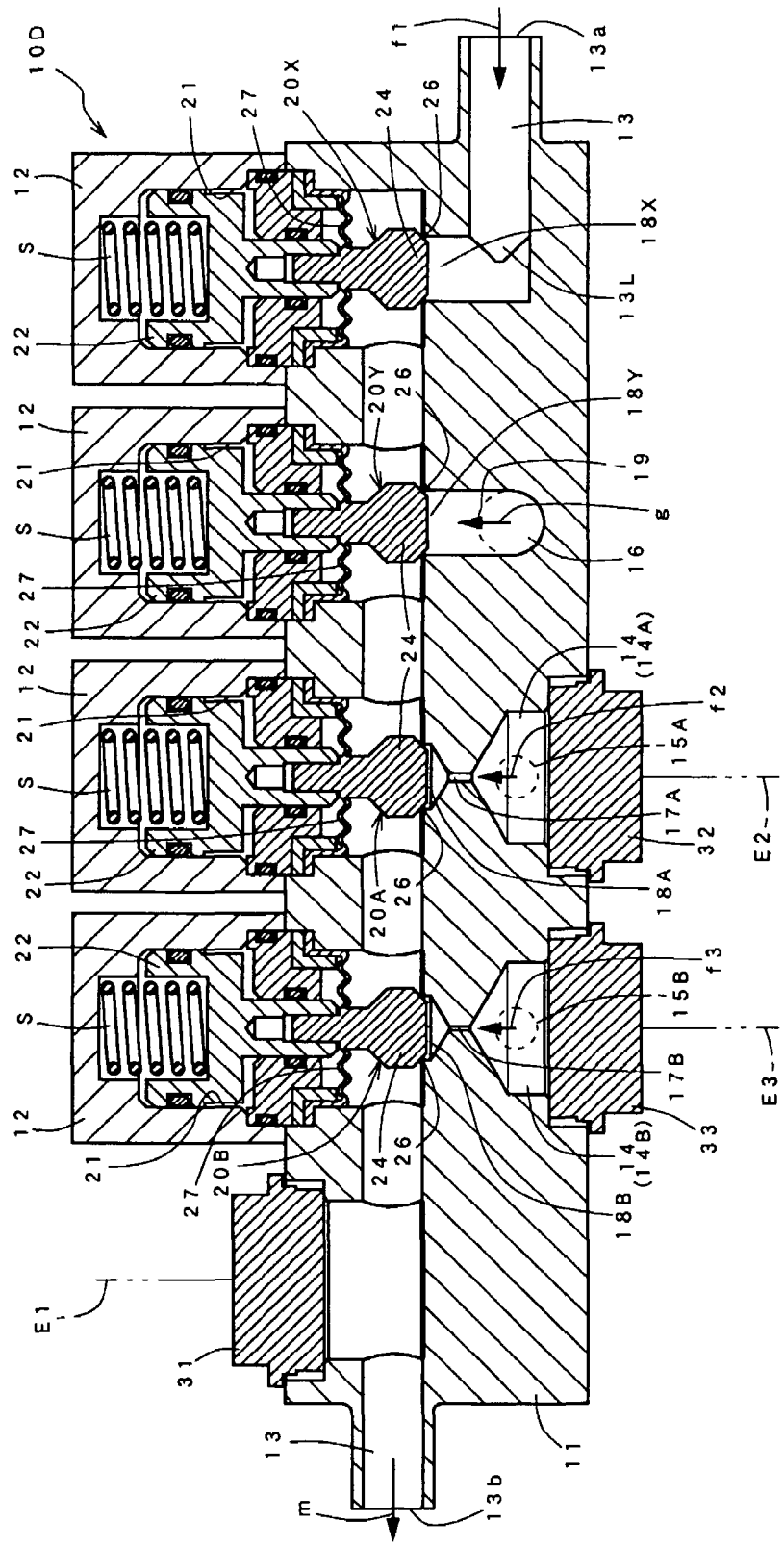
FIG. 4 is a sectional view of a sixth embodiment of a mixing valve according to the present invention.
Figure 5:
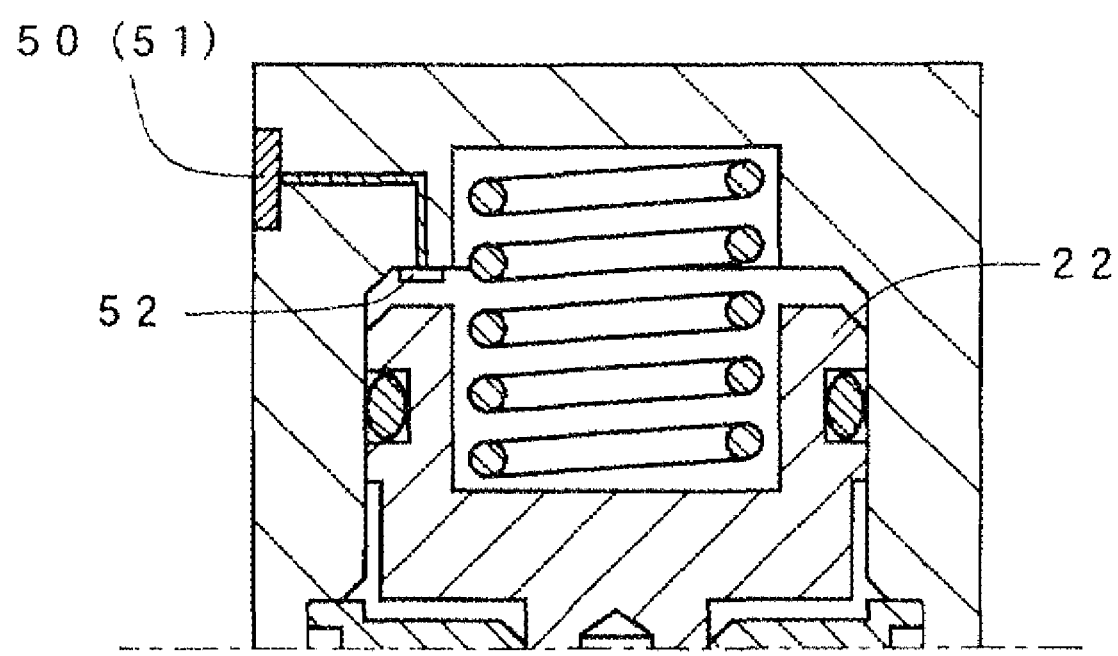
FIG. 5 is a partially sectional view of a mixing valve provided with display means to display the open/close of an opening/closing valve portion.
Figure 6:
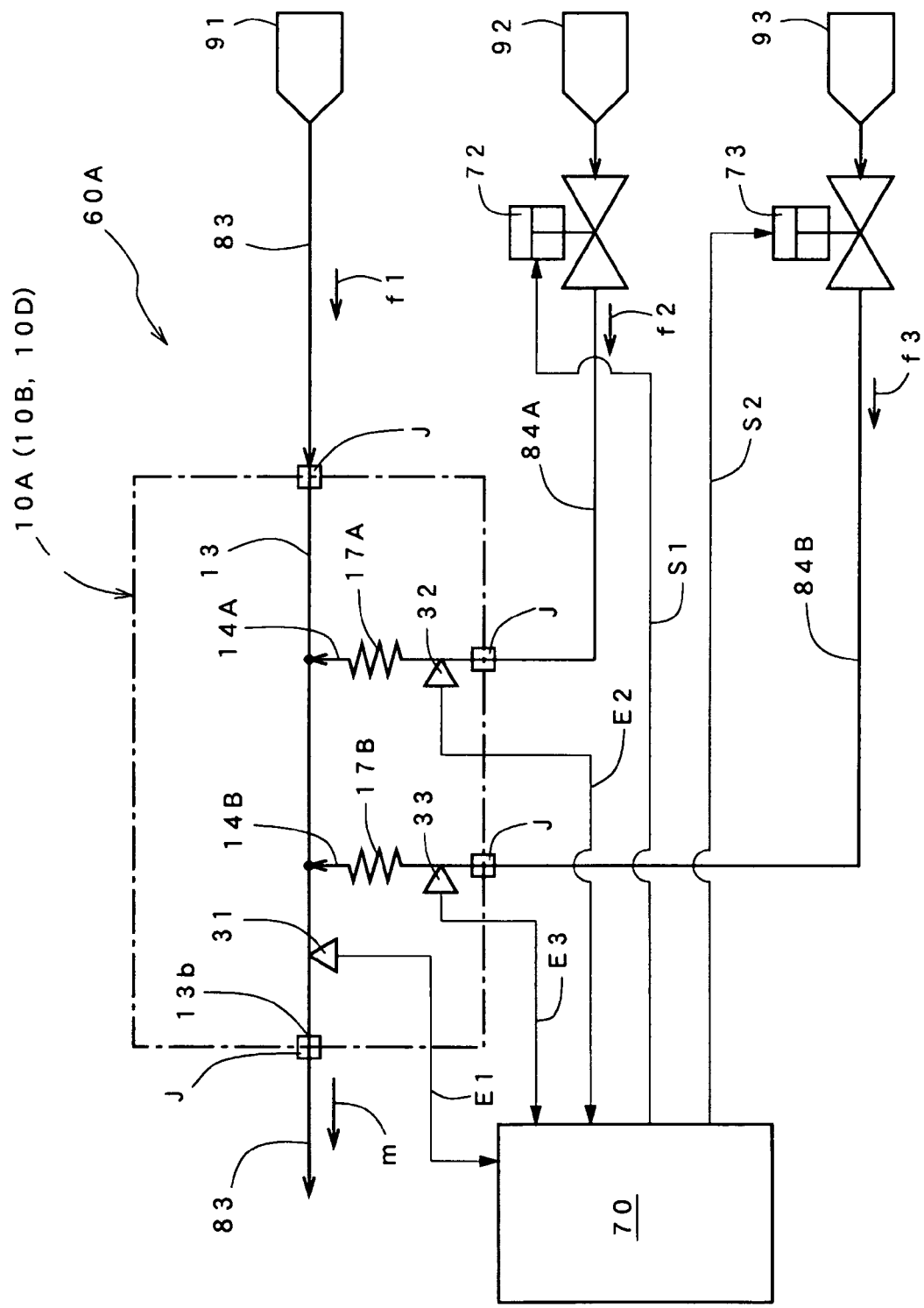
FIG. 6 is a control circuit diagram of an eighth embodiment of a mixing valve according to the present invention.
Figure 7:
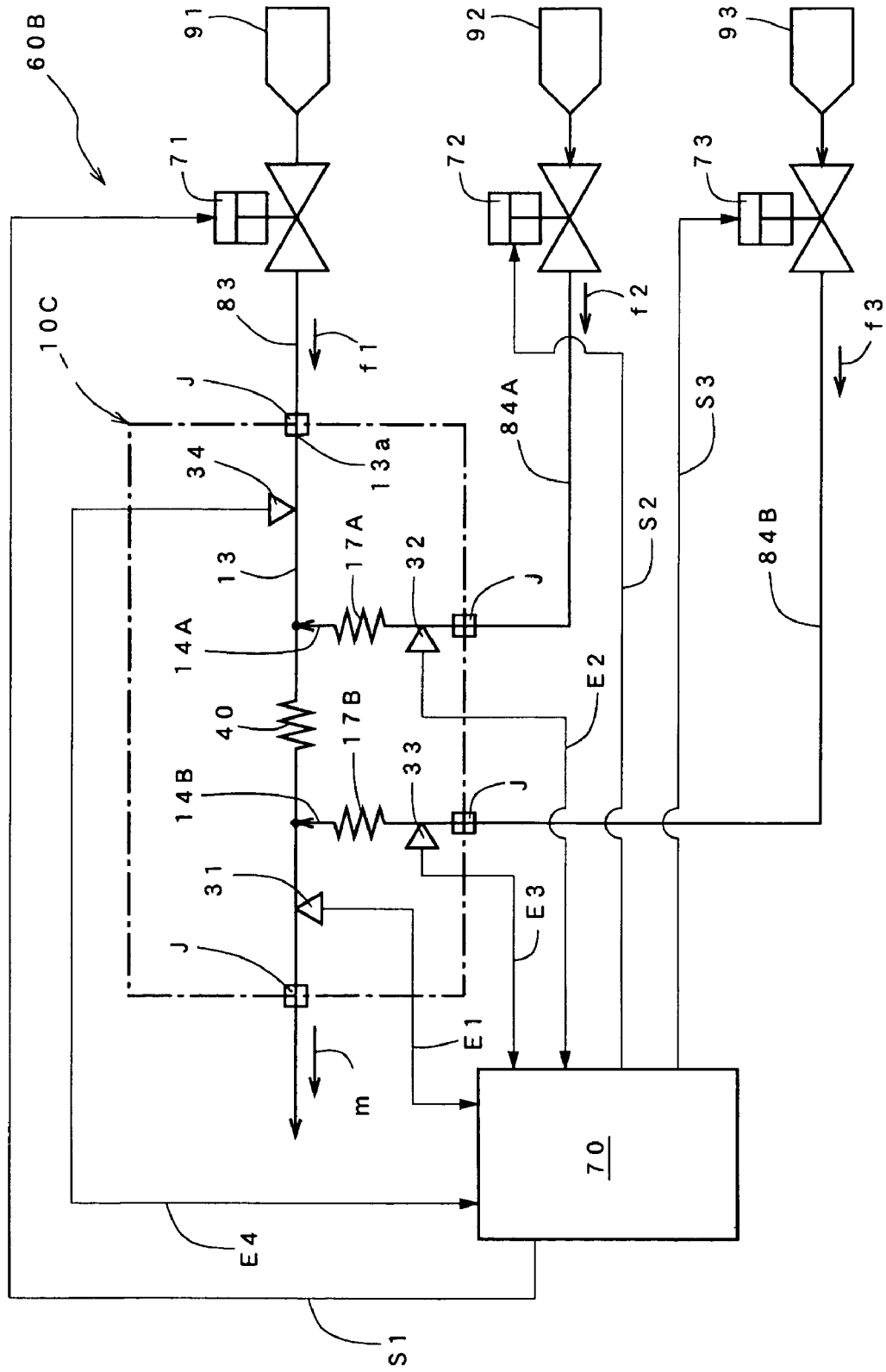
FIG. 7 is a control circuit diagram of a ninth embodiment of a mixing valve according to the present invention.
Figure 8:
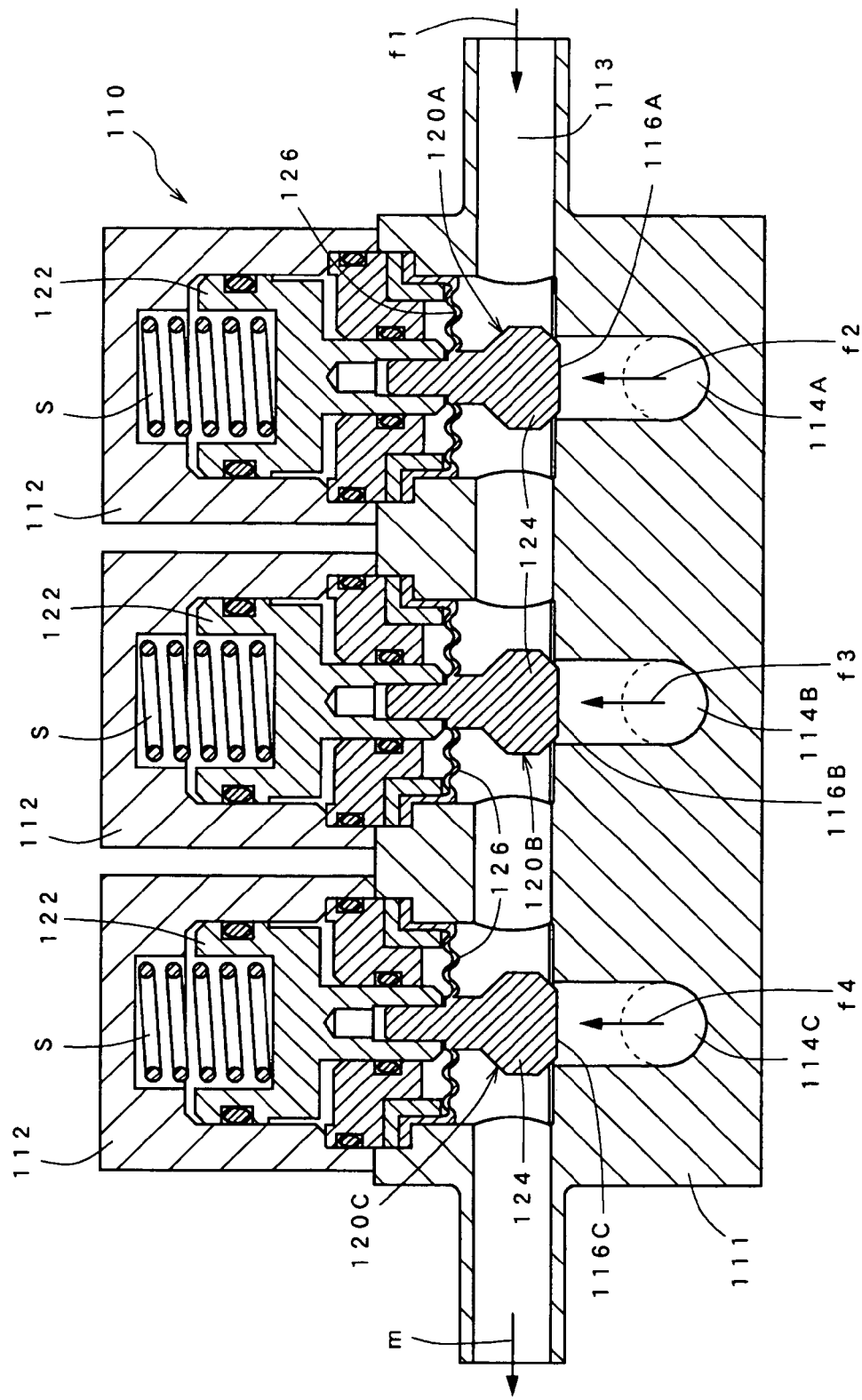
FIG. 8 is a sectional view of an example of a conventional mixing valve.

The present invention will be described below with reference to the accompanying drawings. FIG. 1 is a sectional view of a first embodiment of a mixing valve according to the present invention. FIG. 2 is a sectional view of a second embodiment of a mixing valve. FIG. 3 is a sectional view of a third embodiment of a mixing valve. FIG. 4 is a sixth embodiment of a mixing valve. FIG. 5 is a partially sectional view of a mixing valve provided with display means to display the open/close an opening/closing valve portion. FIG. 6 is a control circuit diagram of an eighth embodiment of a mixing device according to the present invention. FIG. 7 is a control circuit diagram of a ninth embodiment of a mixing device.

A mixing valve that will be described in the following embodiment is a so-called manifold valve. In a mixing valve 10A in a first embodiment shown in FIG. 1, a main passage 13 is connected to two subsidiary passages 14 (a first subsidiary passage 14A and a second subsidiary passage 14B) via opening/closing valve portions 20A, 20B that open/close communicating openings 18A, 18B. The main passage 13 and subsidiary passages 14A, 14B are provided with pressure sensors 31, 32, 33, respectively. In the drawing, numeral 11 designates a main body block, and numeral 12 designates a valve block.

The main passage 13 is a passage, through which a first fluid (here, pure water) f1 flows, and it substantially horizontally penetrates a main body block 11 formed in the shape of a substantial rectangular parallelepiped, in the longitudinal direction thereof. Both ends of the main passage 13 are represented by connection openings 13a (upstream side), 13b (downstream side), and are connected to an outside pipe or a fluid device via connectors (not shown). In this embodiment, in the main passage 13, a pressure sensor 31 which detects a pressure of a mixed fluid "m" passing through the main passage 13 is disposed on the downstream (13b) side with respect to the communicating openings 18A, 18B of the subsidiary passages 14A, 14B. Conventional pressure sensors can be used as the pressure sensor 31 (and other pressure sensors). A detection signal in the pressure sensor 31 is converted to an electrical signal E1, and is transferred to a controller 70 that will be described below.

The subsidiary passages 14 (the first subsidiary passage 14A and the second subsidiary passage 14B) are passages through which the other fluids (here, chemicals), i.e., a second fluid f2 and a third fluid f3 flow, and are formed below the main passage 13 to upwardly supply the second fluid f2 and the third fluid f3 to the main passage 13 via the communicating openings 18A, 18B, respectively. The subsidiary passages 14A, 14B have diameter reduced portions 17A, 17B in which the diameters of the passages are reduced, respectively. In the diameter reduced portions 17A, 17B, the pressure losses of the fluids f2, f3 flowing through the subsidiary passages 14A, 14B occur, respectively. The diameters of the diameter reduced portions 17A, 17B are appropriately determined in accordance with flow rates of the fluids f2, f3 passing through the subsidiary passages 14A, 14B, respectively. In the drawing, numerals 15A, 15B designate connection openings via which the subsidiary passages 14A, 14B are connected to the outside pipes or the like, respectively.

A pressure sensor 32 which detects a pressure of the second fluid f2 flowing through the first subsidiary passage 14A is disposed in the first subsidiary passage 14A, and a pressure sensor 33 which detects a pressure of the third fluid f3 passing through the second subsidiary passage 14B is disposed in the second subsidiary passage 14B. Detection signals of the pressures of the fluids f2, f3, which are detected by the pressure sensors 32, 33 are converted to electrical signals E2, E3, and are sent to the controller 70 that will be described later.

The opening/closing valve portions 20A, 20B are disposed on the communicating openings 18A, 18B of the main passage 13. As described above, valve bodies 24 are upwardly or downwardly moved across the main passage 13 by air controlled by a controller (not shown), so that the corresponding communicating openings 18A, 18B are opened/closed inside the main passage 13, to supply or stop supplying the fluids f2, f3 from the subsidiary passages 14A, 14B into the main passage 13. Numeral 21 designates a cylinder, 22 designates a piston, 26 designates a valve seat formed on the communicating opening 18A or 18B, 27 designates a diaphragm, and "S" designates a spring to always bias the valve body 24 in the forward direction.

In the mixing valve 10A, the first fluid f1 supplied from the upstream (13a) side in the main passage 13 is mixed with the fluids f2, f3 supplied from the subsidiary passages 14A, 14B, respectively. The mixed fluid designated by numeral "m" is discharged through the downstream (13b) side portion of the main passage 13.

In an embodiment of the mixing valve 10A, as illustrated and defined as the invention according to the fifth embodiment, the valve seats 26 of the communicating openings 18A, 18B in the opening/closing valve portions 20A, 20B are disposed so as to face the inside of the main passage 13; and the subsidiary passages 14A, 14B are closed, inside the main passage 13, by valve bodies 24 of the opening/closing valve portions 20A, 20B. With this structure, the residence of the fluid (so-called "residue") occurring when the opening/closing valve portions 20A, 20B are closed can be reduced, and connections between the main passage 13 and the subsidiary passages 14A, 14B can be effectively and efficiently cleaned.

A mixing valve 10B in a second embodiment will be described below. In the following embodiments, components designated by numerals identical to those in the first embodiment have the same structure and, accordingly, the description thereof is omitted. As defined in the invention according to the second embodiment, in the mixing valve 10B in the second embodiment shown in FIG. 2, an opening/closing valve portion 20X for the first fluid f1 is provided in the main passage 13 of the mixing valve 10A in the first embodiment. In the mixing valve 10B, the upstream (13a) side portion of the main passage 13 in the main body block 11 is downwardly bent and is shaped like "L", and the opening/closing valve portion 20X is disposed in a bent communicating portion 18X of the bent portion designated by numeral "13L".

In the mixing valve 10B, the first fluid f1 is upwardly supplied via the bent communicating portion 18X, and flows toward the downstream (13b) side portion of the main passage 13. The opening/closing valve portion 20X is operated to stop the flow of the first fluid f1 as necessary. The structure and the operation of the opening/closing valve portion 20X are identical to those of the opening/closing valve portions 20A, 20B and, accordingly, the components thereof are designated by the same numerals and the description of the components are omitted.

In a mixing valve 10C in a third embodiment shown in FIG. 3, as defined in the invention according to the third embodiment, a plurality of pressure sensors 31 to 34 are arranged via a pressure loss portion 40 in the main passage 13. In this embodiment, for example, the first pressure sensor 31 is disposed on the downstream (13b) side with respect to the communicating opening 18A, 18B in the main passage 13, and the second pressure sensor 34 is disposed in the bent portion 13L, on the upstream (13a) side in the main passage 13. The first pressure sensor 31 detects the pressure of the mixed fluid "m" at the portion of the main passage 13, on which the sensor 31 is disposed. The second pressure sensor 34 detects the pressure of the first fluid f1 at the bent portion 13L in the main passage 13.

The pressure loss portion 40 is provided between the pressure sensors 31 and 34 in the main passage 13, and reduces the diameter of the main passage between the pressure sensors 31 and 34. The pressure loss portion 40 can be easily manufactured if it is formed as, for example, an orifice 41, as defined in the invention according to the fourth embodiment.

In a mixing valve 10D in a sixth embodiment shown in FIG. 4, as defined as the invention according to the sixth embodiment, a passage 16 for a washing fluid "g" is connected to the main passage 13 via an opening/closing valve portion 20Y. In this embodiment, the washing fluid passage 16 is provided on the upstream (13a) side with respect to the communicating openings 18A, 18B of the main passage 13, and is formed beneath the main passage 13, so that the washing fluid "g" is upwardly supplied to the main passage 13 through the communicating opening 18Y. Numeral 19 designates a connection opening connected to an outside pipe for the washing fluid "g". The structure and the operation of the opening/closing valve portion 20Y are identical to those of the opening/closing valve portions 20A, 20B and, accordingly, the components thereof are designated by the same numerals and the description of the components are omitted.

As the washing fluid "g", gas such as compression air as well as various cleaning liquids is used. When a washing operation is carried out using the washing fluid "g", the opening/closing valve portions 20X, 20A, 20B are closed to stop the flows of the fluids f1, f2, f3 through the main passage 13 and the subsidiary passages 14A, 14B, and the opening/closing valve portion 20Y for the washing fluid "g" is opened to pass the washing fluid "g" through the main passage 13 via the communicating opening 18Y. The washing fluid "g" is usually compressed to carry out a flushing operation.

In the above-described mixing valves 10A, 10B, 10C, 10D, as illustrated in FIG. 5 and defined as the invention according to the seventh embodiment, display means 50 can be provided to display the open/close of the valves of the opening/closing valve portions 20A, 20B, 20X, 20Y. As shown in FIG. 5, light emitting means such as a LED 51 is preferably used as the outside display means 50. The open/close of the valves can be detected by a photoelectronic sensor and a load sensor as well as a known limit switch 52 which detects the movement of a piston 22 which moves the valve body 24.

A mixing device using the mixing valve according the present invention will be described below with reference to FIGS. 6 and 7. As defined in the invention according to the eighth embodiment, a mixing device 60A shown in FIG. 6 is disposed on fluid supply passages 84A, 84B connected to the mixing valve (e.g. the mixing valve 10A (10B, 10D)), or connected to at least the subsidiary passages 14A, 14B of the mixing valve, and has control valves 72, 73 which controls the flow rate or the pressure of fluid passing through the supply passage; and a controller 70 which receives signals E1, E2, E3 from the pressure sensors 31, 32, 33 of the mixing valve, to calculate based on the signals, and to send signals S1, S2, S3 used for maintaining a mixing ratio. In FIG. 6, numeral 83 designates a supply passage of the first fluid f1, numerals 91, 92, 93 designate supplying portions of the first, second, third fluids f1, f2, f3, respectively, and numeral "J" designates a connection between the mixing valve and an outside pipe or an outside device.

In the mixing device 60A shown in FIG. 6, the mixing valve 10A (mixing valves 10B, 10D), in which the pressure sensor 31 is provided on the downstream (13b) side in the main passage 13, is used. In order to simplify the description of the mixing device 60, the opening/closing valve portion and the passage for the washing fluid are omitted. In the mixing device 60A, the control valves 72, 73 which control the flow rate or the pressure of the fluids f2, f3 passing through the supply passages 84A, 84B are disposed in the fluid supply passages 84A, 84B connected to the subsidiary passages 14A, 14B in the mixing valve 10A. The signals E1, E2, E3 from the pressure sensors 31, 32, 33 of the mixing valve 10A are sent to the controller 70, and a calculation is carried out in the controller 70. After that, the signals S1, S2 used for maintaining a predetermined mixing ratio of the mixed fluid "m" are sent from the controller 70 to the control valves 72, 73. The control valves 72, 73 control the flow rate or the pressure of the fluids f2, f3 passing through the supply passages 84A, 84B in accordance with the signals S1, S2.

As described above, in the mixing valve 10A of the mixing device 60A, the pressure sensor 31 is provided on the downstream (13b) side in the main passage 13, and detects the pressure of the mixed fluid "m" which is obtained by mixing the first, second and third fluids f1, f2, f3 and passes through the downstream (13b) side portion of the main passage 13. The pressure sensors 32, 33 on the subsidiary passages 14A, 14B detect the pressures of the second and third fluids f2, f3, respectively. Accordingly, in the mixing device 60A, the flow rate or the pressure of the second and third fluids f2, f3 is controlled, by the control valves 72, 73, with respect to that of the first fluid f1. Therefore, in this embodiment, the device has an advantage when the first fluid f1 passes through the main passage 13 at a predetermined flow rate.

Here, the control valves 72, 73 are described. As this control valve, it is preferable to use a flow control valve in which a valve body is moved in forward-and-backward directions to vary the flow rate of a fluid in accordance with variations of the pressure of the fluid. For example, a flow control valve disclosed in Japanese Patent No. 2,671,183 or Japanese Patent No. 3,276,936 assigned to Advance Electric Co., Inc. is preferable.

According to the invention described in the ninth embodiment, in a mixing device 60B shown in FIG. 7, the pressure sensor 34 is added to the mixing device 60A in the above embodiment, and is provided on the upstream (13a) side in the main passage 13. The pressure sensor 34 detects the pressure of the first fluid f1 passing through the main passage 13, and the flow rate or the pressure of the first fluid f1 passing through the supply passage 83 is controlled, based on the detected pressure, by the control valve 71 provided on the supply passage 83 for the first fluid.

In the mixing device 60B, the detection signal E1 obtained by detecting the pressure of the mixed fluid "m" passing through the main passage 13, the detection signal E4 obtained by detecting the pressure of the first fluid f1, and the detection signals E2, E3 obtained by detecting the pressures of the second and third fluids f2, f3 passing through the subsidiary passages 14A, 14B are sent to the controller 70. The signals S1, S2, S3 for maintaining a predetermined mixing ratio, which are obtained by a calculation carried out based on the detection signals are transferred from the controller 70 to the control valves 71, 72, 73, to control the flow rates or the pressures of the first, second and third fluids f1, f2, f3 passing through the first, second and third supply passages 83, 84A, 84B. Therefore, in this embodiment, if the flow rate of the mixed fluid "m" varies, the mixing ratio of the first, second and third fluids f1, f2, f3 can be maintained. The control valve 71 is similar to the control valves 72, 73, and components in FIG. 7 identical to those in FIG. 6 are designated by the same numerals.

The mixing valve and the mixing device according to the present invention have been described above. However, the present invention is not limited to the above-described embodiments, and several modifications may be made therein without departing from the gist of the invention. For example, the number of the subsidiary passages connected to the main passage via the opening/closing valve portions is not limited. The structure can be changed for many purposes. For example, two or more subsidiary passages may be connected via one opening/closing valve portion. The number and the position of the pressure sensors disposed in the main passage can be appropriately determined in accordance with the number and the position of the communicating openings provided on the subsidiary passages.

What is claimed is:

1. A mixing valve in which a main passage through which one fluid passes is penetrated horizontally from an upstream side of a main body block to a downstream side of the main body block, and
    at least one subsidiary passage through which other fluids pass is connected to the main passage via an opening/closing valve portion to open/close a communicating opening with a diameter reduced portion as a pressure loss portion, and
    wherein a valve body of the opening/closing valve portion to open/close a communicating opening is disposed so as to face inside the main passage, and
    the at least one subsidiary passage is closed by the valve body of the opening/closing valve portion, and
    wherein a pressure sensor which detects a pressure of the fluid passing through the main passage is disposed in the main body block, and
    a pressure sensor which detects the other fluids is disposed on the upstream side of the diameter reduced portion of at least one subsidiary passage connecting to the main passage of the main body block.

2. A mixing valve according to claim 1, wherein an opening/closing valve portion for the one fluid is provided in the main passage.

3. A mixing valve according to claim 1, wherein a plurality of pressure sensors are arranged in the main passage via a pressure loss portion.

4. A mixing valve according to claim 3, wherein the pressure loss portion is an orifice.

5. A mixing valve according to claim 1, wherein a passage for a washing fluid is connected to the main passage via the opening/closing valve portion.

6. A mixing valve according to claim 1, wherein there is provided display means to display an open/closed position of the valve body of the opening/closing valve portion.

7. A mixing device comprising
    the mixing valve described in claim 1;
    a control valve disposed in a fluid supply passage connected to at least the subsidiary passage of the mixing valve, to control the flow rate or the pressure of a fluid passing through the supply passage; and a controller which calculates based on signals received from the pressure sensor of the mixing valve, to send a signal for maintaining a predetermined mixing ratio to the control valve.

8. A mixing device according to claim 7, further comprising a control valve disposed in a fluid supply passage connected to the main passage of the mixing valve, to control the flow rate or the pressure of a fluid passing through the supply passage.

* * * * *